United States Patent [19]

Bauman

[11] Patent Number: 4,497,715
[45] Date of Patent: Feb. 5, 1985

[54] N-ALKYLISOSTEARAMIDES AS ANTISTATIC AGENTS

[75] Inventor: Robert A. Bauman, New Brunswick, N.J.

[73] Assignee: Colgate-Palmolive Company, New York, N.Y.

[21] Appl. No.: 404,794

[22] Filed: Aug. 3, 1982

[51] Int. Cl.³ .................. C11D 3/32; D06M 13/40
[52] U.S. Cl. .................. 252/8.8; 252/135; 252/174.25; 252/525; 252/544; 260/404
[58] Field of Search ............ 252/8.8, 525, 544, 135; 260/404

[56] References Cited

U.S. PATENT DOCUMENTS

| | | | |
|---|---|---|---|
| 3,285,856 | 11/1966 | Lew | 252/525 X |
| 3,835,148 | 9/1974 | Oxe et al. | 524/105 |
| 3,843,543 | 10/1974 | Hewitt | 252/153 |
| 4,076,631 | 2/1978 | Caruso et al. | 252/8.8 |
| 4,272,413 | 6/1981 | Bauman | 252/525 |

FOREIGN PATENT DOCUMENTS

| | | |
|---|---|---|
| EP32267 | 7/1981 | European Pat. Off. . |
| 17403 | 6/1970 | Japan . |
| 22121 | 7/1970 | Japan . |
| 22122 | 7/1970 | Japan . |
| 22521 | 7/1970 | Japan . |
| 463300 | 3/1937 | United Kingdom . |
| 2033444 | 5/1980 | United Kingdom . |

*Primary Examiner*—Prince E. Willis
*Attorney, Agent, or Firm*—Herbert S. Sylvester; Murray M. Grill; Norman Blumenkopf

[57] ABSTRACT

N-alkylisostearamides useful as antistatic agents for laundered fabrics; detergent compositions containing an effective antistatic amount of said amide; and a method of protecting fabrics against acquiring static electricity by contacting fabrics with said composition during laundering. These compounds provide antistatic protection without reducing optical brightener and detergency performance of the detergent composition.

20 Claims, No Drawings

N-ALKYLISOSTEARAMIDES AS ANTISTATIC AGENTS

BACKGROUND AND PRIOR ART

This invention relates to novel antistatic agents and detergent compositions, to be used in the laundering of fabrics, containing said antistatic agent, which is a N-alkylisestearamide having the formula:

RCONHR'

Wherein RCO is derived from isostearic acid, and R' is a primary saturated or unsaturated aliphatic hydrocarbon chain containing 1 to 18 carbon atoms and preferably 7–18 carbons.

The use of various and diverse chemical materials and particularly cationic quaternary ammonium compounds as softeners and antistatic agents for textile products is very well known in the art. It is also well known to employ such materials for their antistatic and softening effects during the laundering operation and particularly in the rinse cycle of the laundering process. This latter technique has been necessitated by the fact that the aforesaid quaternary compounds heretofore employed, being mainly cationic in nature, were not compatible with the anionic detergents, one of the major types of detergents used in the washing cycle. Furthermore, said quaternary compounds are substantially ineffective in the presence of nonionic detergents.

It is also well known that there is a tendency for laundered articles to yellow or discolor when treated with the aforesaid quaternary compounds.

Another disadvantage associated with the use of said cationic agents in the laundering of fabrics with non-ionic detergents is their interference with the deposition on the fabrics of optical brightener, thereby reducing optical brightener performance of a detergent composition containing said optical brightener.

Still another disadvantage of the cationic quaternary ammonium antistatic softeners is their interference with the cleaning properties of the detergent by reducing the soil removal effected by the detergent, resulting in decreased washing effectiveness. The presence of the anionic detergent material substantially negates the fabric softening properties of the cationic quaternary ammonium compounds and counteracts the minimal antistatic activity possessed by said quaternary compounds.

Accordingly, U.S. Pat. No. 3,451,927 uses a fabric softening and antistatic composition in the water rinse during laundering, comprising a cationic quaternary ammonium compound in conjunction with an alkylethanolamide.

N-alkyl fatty acid amides, where said alkyl radical contains 1-22 carbon atoms, are disclosed in U.S. Pat. No. 3,231,508 as foam depressants in anionic detergents; N-alkyl fatty acid amides, where said alkyl contains 12-18 carbon atoms, are disclosed in U.S. Pat. No. 2,691,636 as foam stabilizers in anionic detergents; N-dodecylacetamide has been used in anionic or nonionic detergent compositions as a foam enhancer, as shown in U.S. Pat. No. 2,702,278; and higher alkyl hydroxyacetamides or -butyramides have been found useful in nonionic detergents as foam improvers, as is shown in U.S. Pat. No. 3,250,719.

Mono- or diamides having the formula

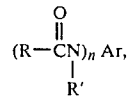

where R is an aliphatic straight- or branched-chain hydrocarbon radical having from 1 to 23 carbon atoms, R' is hydrogen or an aliphatic straight- or branched-chain hydrocarbon radical having 1 to 10 carbons, n is 1 or 2 and Ar is a substituted or unsubstituted aromatic radical, are used as pearling agents in shampoo compositions, as shown in U.S. Pat. No. 2,891,912.

Anionic, amphoteric and/or nonionic detergent compositions containing higher alkyl polyhydroxylated carboxamides as textile softening agents are disclosed in U.S. Pat. No. 3,654,166; and higher fatty acid monoamides of hydroxyalkylpolyamine as textile softeners are disclosed in U.S. Pat. No. 3,704,228.

Fatty amide-alkylene oxide reaction products have also been utilized as textile softening agents for laundered fabrics, as disclosed in U.S. Pat. No. 4,060,505.

N-substituted short chain carboxamides of secondary aliphatic beta amines have been used as antistatic agents in the laundering process, as shown in U.S. Pat. No. 4,283,192.

Isostearic acid, partially neutralized to a mixture of the soap and said acid, forms a stable opaque liquid conditioning shampoo, as shown in U.S. Pat. No. 3,590,122; and said combination of isostearate salt and isostearic acid has also been used as two components in a four component emulsifying and solubilizing composition, as shown in U.S. Pat. No. 4,097,403.

An alkali metal salt of isostearic acid has been used together with a noncationic detergent in a fabric softening detergent composition, as shown by U.S. Pat. No. 3,625,905.

However, none of aforesaid prior art discloses N-alkylisostearamides as antistatic agents in the presence of built or unbuilt anionic and/or nonionic detergents.

SUMMARY OF THE INVENTION

It has now been discovered that the N-alkylisostearamides of this invention are antistatic agents for synthetic fabrics, which may be applied from a washing solution without depressing the performance of the detergent or interfering with the activity of optical brighteners that may be present in the detergent composition.

Accordingly, it is a primary object of the present invention to protect fabrics against acquiring static charges during machine drying subsequent to the laundering.

Another object of the present invention is to provide such protection in conjunction with conventional detergent compositions during the home laundering process.

Still another object of the present invention is to provide antistatic agents which are active in the presence of built laundry detergents.

A further object of the present invention is to provide antistatic protection without depressing detergency and without reducing optical brightener performance.

Still a further object of the present invention is to provide an antistatic composition which may be employed in conjunction with detergents and other cleaning, brightening and laundering additives in a single step laundering operation.

Still another object of the present invention is to provide a method of applying to fabrics, during laundering, a protective treatment against subsequent developements of static charges.

Additional objects, advantages and novel features of the invention will be set forth in part in the description which follows, and in part will become apparent to those skilled in the art upon examination of this description or may be learned by practice of the invention. The objects and advantages of the invention may be realized and attained by means of the instrumentalities and combinations particularly pointed out in the appended claims.

To achieve the foregoing and other objects, and in accordance with the present invention, as embodied and broadly described herein, the antistatic composition of this invention for laundering fabrics comprises an antistatic amount of an N-alkylisostearamide represented by the structural formula:

RCONHR' wherein RCO is derived from isostearic acid, and R' is a primary aliphatic saturated or unsaturated hydrocarbon chain containing 1 to 18 carbons; and the method of imparting antistatic properties to fabrics comprises treating fabrics with a composition containing an antistatic amount of said N-alkylisostearamide in the wash cycle of the laundering process, either as a separate additive, dispersed with or absorbed by a carrier material, or premixed with the detergent. More specifically, antistatic properties are imparted to fabrics by laundering the fabrics with a composition containing a detergent, preferably anionic or nonionic, an above-defined N-alkyl isostearamide, and other ingredients, such as builders, optical brighteners, enzymes, bleaches, and other conventional additives.

More specifically, the present invention relates to N-alkylisostearamides as antistatic agents to be used in the wash cycle of the laundering of fabrics; and to antistatic compositions for laundering fabrics comprising said antistatic agent, detergents selected from the group consisting of anionic, nonionic and amphoteric surfactants and mixtures thereof, and preferably, builder salts and optical brighteners. The method of imparting antistatic properties to fabrics during laundering comprises treating said fabrics during the wash cycle with said antistatic N-alkylisostearamides.

The present N-alkylisostearamides, wherein the alkyl group contains 1–18 carbon atoms derived from a saturated or unsaturated primary amine, reduces or prevents the generation of static electricity on cotton and synthetic fabrics during laundering. These antistatic properties can be imparted to fabrics by laundering in a detergent composition containing said isostearamides which are completely compatible with anionic, nonionic and amphoteric detergents; or by the separate addition of said antistatic agent to the wash cycle during laundering. This same treatment has been found to additionally confer a soft hand on cotton fabrics and does not depress detergency activity of the detergent composition. These beneficial effects are achieved without yellowing or discoloration of the fabrics and without interference with the action of optical brighteners that may be present in the detergent composition. These N-alkylisostearamides are not pH sensitive, thereby enabling their use together with built detergents.

The N-alkylisostearamides of the present invention can generally be prepared by the conventional methods for amide synthesis. Isostearic acid is converted to the acid chloride by reaction with thionyl chloride, which acid chloride is added to a primary amine, dissolved in a solvent such as water, ether or methylene chloride, to form the amide. The amide is isolated as a viscous liquid or waxy solid depending on the molecular weight. The infrared spectrum absorption curve shows absorption at 3.05, 6.1, and 6.5 microns, which is characteristic of secondary amides.

More specifically, the present N-alkylisostearamides are prepared from known starting materials by means of a two-step process, first converting isostearic acid, which is a mixture of branched-chain isomers of stearic acid of the formula $C_{17}H_{35}COOH$, having primarily methyl branching, to the isostearoyl chloride by reacting with thionyl chloride, and then reacting said isostearoyl chloride with a primary aliphatic amine containing 1 to 18 carbons. These reactions may be represented by the following equations, wherein R and R' are as aforedefined:

1. $RCOOH + SOCl_2 \xrightarrow{\text{dimethyl formamide}} RCOCl + HCl + SO_2$

2. $RCOCl + R'NH_2 \longrightarrow RCONHR' + HCl$

The conversion of the isostearic acid to the isostearoyl chloride is preferably conducted in the presence of dimethyl formamide, which acts as a catalyst in this reaction. Since the amide reaction is exothermic, cooling may be desirable in order to control the temperature. This reaction is preferably conducted in the presence of any non-reactive solvent, such as water, methylene chloride, methyl or ethyl ether, benzene, chloroform or the like, and in the presence of any tertiary amine such as trimethyl amine, pyridine and preferably triethylamine, which reacts with the acid byproduct formed during this reaction. The reaction mixture may be washed successively with water or alcohol/water mixtures, dilute acid and water to remove any unreacted starting material, and may be dried over $Na_2SO_4$ to similar neutral salt. The solvent is removed, preferably by evaporating in vacuum. The resultant N-alkylisostearamides are liquids, oils or solids.

The following examples illustrate the manner in which compounds of this invention are prepared, but the invention is not limited thereto.

EXAMPLE 1

Preparation of N-Propylisostearamide ($RCONHCH_2CH_2CH_3$, wherein R is a complex mixture of branched isomers of stearic acid)

14 G (0.05 mole) isostearic acid (Emersol 871, sold by Emery Industries) and 6.5 g (0.055 mole) thionyl chloride are mixed under nitrogen gas and 0.1 ml dimethyl formamide (catalyst) is added. This mixture is stirred for 20 minutes on a warm water bath, charged with $N_2$ and stirred another 10 minutes. Infrared spectra readings show some acid peaks still present. An additional 0.5 g of thionyl chloride is added and stirred another 10 minutes. Infrared readings show negligible acid peaks. The resultant product is isostearoyl chloride.

This isostearoyl chloride is added to 7 g (0.12 mole) of n-propylamine in 70 ml ether and the mix is stirred in an ice bath, and is stirred another 10 minutes at room temperature. The amide is extracted with ether, washed twice with water, twice with 5% HCl and again with water until neutral, dried over Na$_2$SO$_4$ and evaporated in vacuum to 14 g of a light amber liquid. Infrared spectra bands show absorptions at 3290, 3076, 1645 and 1546 cm$^{-1}$, typical of secondary amides.

EXAMPLE 2

(Preparation of N-Methylisostearamide)

The isostearoyl chloride which is prepared according to the procedure of Example 1 is added to 15 ml of 40% methylamine in 50 ml water and the mix is stirred in an ice bath. The reaction mixture is then stirred 15 minutes a room temperaure, extracted with ether, washed twice with a 5% HCl solution, and then with water, until neutral. Infrared spectra readings are typical of a secondary amide.

EXAMPLE 3

(Preparation of N-Octylisostearamide)

Isostearoyl chloride, prepared from 20 g isostearic acid, 10.1 g thionyl chloride and 0.2 ml dimethyl formamide, according to the procedure of Example 1, is added to 11 g (0.09 mole) n-octylamine and 10 g. (0.10 mole) triethylamine in 100 ml ether. The reaction mixture is treated in accordance with the procedure of Example 2, yielding 22 g of an amber oil which exhibits infrared spectra values typical of a secondary amide.

EXAMPLE 4

(Preparation of N-Cocoalkylisostearamide)

256 g (0.9 mole) isostearic acid, 128 g (1.08 mole) thionyl chloride and 4.5 ml dimethylformamide are placed in a flask surrounded by a warm water bath and stirred under N$_2$ for ½ hour. At this time an infrared spectrum indicated no unreacted acid. The HCl formed in this reaction is blown out with N$_2$. After ½ hour, the reaction mixture is heated in a vacuum to remove excess thionyl chloride, and distilled to recover the isostearoyl chloride which is collected at 140°–150° C. and 0.2 mm pressure, giving a yield of 242 g (89% of theory).

The isostearoyl chloride (54 g) is added in about 25 minutes to 37 g cocoamine (C$_{10}$–C$_{14}$), 250 ml methylene chloride and 25 ml triethylamine, while maintaining the temperature below 25° C. After complete addition of the isostearoyl chloride, the mixture is stirred at room temperature for ½ hour. The reaction mixture is transferred to a separatory funnel and washed twice with a 25% alcohol water mixture, then washed twice with 5% HCl and again twice with the alcohol water mixture until neutral to pH test paper. The reaction produce is dried over Na$_2$SO$_4$ and evaporated on a rotary evaporator to 79 g of a thick oil, which is cocoisostearamide. The infrared spectrum shows strong absorption at 3280, 1642 and 1548 cm$^{-1}$, typical of a secondary amide.

EXAMPLE 5

(Preparation of Hydrogenated Tallowisostearamide)

Isostearoyl chloride is prepared from 56 g (0.2 mole) isostearic acid, 25 g (0.21 mole) thionyl chloride, 1 ml dimethylformamide (0.014 mole) and 50 ml methylene chloride (solvent for reaction), by stirring the mixture, without heat or cooling, for ½ hour, and for another ½ hour on a warm water bath. Infrared spectra readings show no carboxylic absorption, indicating completion of the reaction. The amount of the isostearoyl chloride recovered is 70 g.

35 G of the aforesaid isostearoyl chloride are added to 27 g hydrogenated tallow amine, 11 g triethylamine and 150 ml methylene chloride. The resultant N-tallowisostearamide is washed twice with a 25% alcohol-water mixture, washed once with a water solution containing 25% ethanol and 5 ml concentrated HCl and again with the 25% alcohol water mixture until neutral, is filtered and dried over Na$_2$SO$_4$.

Other aliphatic primary amines may be used in the preparation of the present N-alkylisostearamide antistatic agents, such as saturated or unsaturated ethyl, butyl, hexyl, nonyl, decyl, dodecyl, tetradecyl, hexadecyl, heptadecyl and octadecyl amines and mixtures thereof.

Secondary amines such as N,N-diethylamine yield tertiary isostearamides such as N,N-diethylisostearamides which exhibit very limited effect on static, compared to the secondary isostearamides of present invention.

It has been additionally found that isostearamides of amines from heptyl to octadecyl are superior to those with shorter chains; that the isostearamides are efficacious in detergents built with NTA (nitriloacetate) or zeolite, as well as tripolyphosphate; that there is an insignificant loss in detergency; and that there is no adverse effect on the deposition of optical brightener. The N-alkylisostearamides of this invention function equally well in unbuilt and built detergent systems.

The antistatic compounds of this invention may be used in conjunction with detergents which include anionic detergents such as alkylbenzene-sulfonic acid and its salts, e.g., compounds of the formula alkyl-phenyl-SO$_3$-M, wherein the alkyl is an alkyl radical of C$_8$ to C$_{22}$ and preferably C$_{10}$ to C$_{18}$ and M is hydrogen or an alkali metal, which compounds comprise a well-known class of anionic detergents and include sodium dodecylbenzene sulfonate, potassium dodecylbenzenesulfonate, sodium laurylbenzenesulfonate and sodium cetylbenzenesulfonate. Others include paraffin sulfonates, alkyl sulfates, alcohol ether sulfates, olefin sulfonates and the alkylphenolethoxylate sulfates (e.g., sodium dinonylphenoxynonaethoxyethanol sulfate, sodium dodecylhexadecaethoxyethanol sulfate), and other equivalent water-soluble salts, particularly of the alkali metal series.

Among the above-noted alkylbenzene-sulfonic acid and salts thereof, the preferred compounds include those which are biodegradable and which are particularly characterized by a linear alkyl substituent of from C$_{10}$ to C$_{22}$ and preferably from C$_{12}$ to C$_{15}$. It is, of course, understood that the carbon chain length represents, in general, an average chain length since the method for producing such products usually employs alkylating reagents of mixed chain length. It is clear, however, that substantially pure olefins as well as alkylating compounds used in other techniques can and do give alkylated benzene sulfonates wherein the alkyl moiety is substantially (i.e., at least 99%) of one chain length, i.e., C$_{12}$, C$_{13}$, C$_{14}$, or C$_{15}$. The linear alkyl benzene sulfonates are further characterized by the position of the benzene ring in the linear alkyl chain, with any of the position isomers (i.e., alpha to omega) being operable and contemplated.

In addition to the benzene sulfonates one may also employ the lower alkyl (C$_1$ to C$_4$) substituted analogs of benzene such as toluene, xylene, the trimethyl benzenes, ethyl benzene, isopropyl benzene and the like. The sulfonates are generally employed in the water soluble salt form which includes as the cation, the alkali metals, ammonium, and lower amine and alkanolamine cations.

Examples of suitable linear alkyl benzene sulfonates include:

sodium n-decyl benzene sulfonate
    sodium n-dodecyl benzene sulfonate
    sodium n-tetradecyl benzene sulfonate
    sodium n-pentadecyl benzene sulfonate
    sodium n-hexadecyl benzene sulfonate and the corresponding sulfonates of lower alkyl substituted homologues of benzene as well as the salts in which the cations are those previously referred to. Mixtures of these sulfonates may, of course, also be used, which mixtures may include compounds wherein the linear alkyl chain is smaller or larger than indicated herein provided that the average chain length in the mixture conforms to the specific requirements of $C_{10}$ to $C_{22}$.

The linear paraffin sulfonates also constitute a well-known group of compounds and include water soluble salts (alkali metal, amine, alkanolamide, and ammonium) of:

2-decanesulfonic acid,
    2-dodecanesulfonic acid,
    2-tridecanesulfonic acid,
    2-tetradecanesulfonic acid,
    2-pentadecanesulfonic acid, and
    2-hexadecanesulfonic acid, as well as the other position isomers of the sulfonic acid group.

In addition to the paraffin sulfonates illustrated above, others with the alkyl in the general range of $C_{10}$ to $C_{22}$ may be used, with the most preferable range being from $C_{12}$ to $C_{20}$.

The linear alkyl sulfates which are contemplated in this invention are those in which the alkyl is in the range of $C_{10}$ to $C_{20}$. Specific examples include sodium n-decyl sulfate; sodium n-dodecyl sulfate; sodium n-hexadecyl sulfate; sodium n-heptadecyl sulfate; sodium n-octadecyl sulfate; and the ethoxylated (1 to 100 moles ethylene oxide) derivatives; and, of course, other water soluble salts containing other salt-forming cations, as mentioned above.

Included in the group of anionic detergents, which have been described above as suitable in the present invention, are the olefin sulfonates, including long chain alkene sulfonates and long chain hydroxyalkane sulfonates, as well as disulfonates. Examples of suitable olefin sulfonates, which are merely illustrative of the general class, are sodium dodecene-1 sulfonate, sodium tetradecene-1 sulfonate, sodium hexadecene-1 sulfonate and sodium octadecene-1 sulfonate.

Also useful in conjunction with the present antistatic secondary isostearamides are nonionic detergents which are commercially known and include the primary aliphatic alcohol ethoxylates, secondary aliphatic alcohol ethoxylates, alkylphenol ethoxylates and the alcohol ethylene oxide-propylene oxide condensates such as Plurafacs (Wyandotte), and mixtures thereof. The nonionic synthetic organic detergents are generally condensation products of an organic aliphatic or alkyl aromatic hydrophobic compound and hydrophilic ethylene oxide groups. Practically any hydrophobic compound having a carboxy, hydroxy, amide, or amino group with a free hydrogen attached to the nitrogen can be condensed with ethylene oxide or with the polyhydration product thereof, polyethylene glycol, to form a nonionic detergent. Further, the length of the polyethenoxy chain can be adjusted to achieve the desired balance between the hydrophobic and hydrophilic elements.

The nonionic detergents include the polyethylene oxide condensate of one mole of alkyl phenol containing from about 6 to 12 carbon atoms in a straight- or branched-chain configuration with about 5 to 30 moles of ethylene oxide, for example, nonyl phenol condensed with 9 moles of ethylene oxide, dodecyl phenol condensed with 15 moles of ethylene oxide and dinonyl phenol condensed with 15 moles of ethylene oxide. Condensation products of the corresponding alkyl thiophenols with 5 to 30 moles of ethylene oxide are also suitable.

Also included in the nonionic detergent class are the condensation products of a higher alcohol (e.g. an alkanol containing about 8 to 18 carbon atoms in a straight- or branched-chain configuration) condensed with about 5 to 30 moles of ethylene oxide, for example, laurylmyristyl alcohol condensed with about 16 moles of ethylene oxide.

A preferred group of nonionic surfactants are the Neodol ethoxylates (Shell Co.), which are higher aliphatic alcohol ethoxylates having about 5 to 20 ethyleneoxy groups per mole of aliphatic alcohol containing about 10-18 carbon atoms, such as $C_{12-13}$ alkanol condensed with 6.5 moles ethylene oxide, $C_{12-15}$ alkanol condensed with 12 moles ethylene oxide, $C_{14-15}$ alkanol condensed with 13 moles ethylene oxide, and the like.

In addition to the anionic and nonionic detergents which may be employed in conjunction with the antistatic agents of present invention, amphoteric compounds are also useful. Representative of those compounds which may be employed in conjunction with the instant fabric antistatic compounds are the carboxy- and sulfo-betaines.

The amount of detergent may comprise from about 5-75% by weight of the total composition and usually will be from about 15-45% by weight.

The composition of the instant invention may also include, in addition to instant antistatic compounds and conventional anionic, nonionic and amphoteric detergents, builders, brighteners, hydrotropes, germicides, soil suspending agents, anti-redeposition agents, antioxidants, bleaches, coloring materials (dyes and pigments), perfumes, water-soluble alcohols, foam boosters, non-detergent alkali metal benzene sulfonates, etc.

The builder is, generally, a water-soluble, inorganic salt which may be a neutral salt, e.g., sodium sulfate, or an alkaline builder salt, such as phosphates, silicates, bicarbonates, carbonates, citrates and borates. The preferred builders are those characterized as condensed phosphates, such as polyphosphates and pyrophosphates, and alkali citrates. Specific examples of alkaline salts are the tripolyphosphates, tetrasodium pyrophosphate, pentasodium tripolyphosphate (either Phase I or Phase II), sodium hexametaphosphate, and the corresponding potassium salts of these compounds, sodium and potassium silicates, e.g., sodium metasilicate, and other silicates, e.g., of $Na_2O:SiO_2$ in the range of 1.6 to 3, sodium carbonate, potassium carbonate and sodium and potassium bicarbonate, sodium citrate and potassium citrate. Other salts may also be used wherein the compounds are water-soluble including the general class of alkali metals, alkaline earth metals, amine, alkanolamine, and ammonium salts.

Other builders which are salts of organic acids may also be used, and in particular such include the water-soluble (alkali metal, ammonium substituted ammonium and amine) salts of aminopolycarboxylic acids such as:
  ethylene diamine tetra-acetic acid,
  nitrilotriacetic acid,
  diethylene triamine pentaacetic acid,
  N-(2-hydroxyethyl)-ethylene diamine triacetic acid,
  2-hydroxyethyl-iminodiacetic acid,
  1,2-diaminocyclohexane diacetic acid,
and the like.

Water-insoluble builders having cation-exchange properties may be used also, such as the sodium aluminosilicates, for example, Zeolite A, which may be used alone or in combination with other builders, such as sodium tripolyphosphate.

The amount of builder salts may comprise from about 5–75% by weight of the total composition, which may be in liquid or solid form, and usually varies from about 20–70% by weight.

In addition to compositions comprising the N-alkylisostearamide antistatic agents of the instant invention in combination with detergent and conventional laundering additives, it is noted that said antistatic agents may be formulated in suitable absorbent carriers for addition to the wash cycle of the laundering process with the concomitant addition of detergent materials. In connection therewith said amide may be dispersed into, and/or absorbed onto an absorbent carrier for addition to the laundering cycle such as, for example, phosphates, borax, silicates, such as Microcel C (synthetic calcium silicate by Johns Manville), bentonite clays, such as Mineral Colloid 101, formerly Thixo-Jel No. 1 (Georgia Kaolin Co.), a phosphate base bead comprising 37.5% tripolyphosphate, 14.5% sodium silicate, dye, brightener and water, which has been spray dried; or a carbonate base bead comprising the spray dried composition containing 49% sodium bicarbonate, 10.67% sodium carbonate, 17% silicate solids, color and water. The base bead is mixed with the liquid or melted (if solid) isostearamide until said amide is dispersed into and absorbed onto said base bead. The preferred carrier is Microcel C having said isostearamide dispersed therein.

The amount of amide utilized in connection with detergent compositions is generally considered to be a relatively small proportion, as compared to the weight of the active ingredients therein. It is noted, however, that one need only employ an effective amount of said amide which, in fact, produces the desired antistatic action on fabrics. It is preferred that said amide be present in an amount of from about 2% to about 25%, and preferably 5% to 20% of the total ingredients present in the detergent composition, on a weight basis, so that the concentration in the wash solution is in the range 0.002–0.02%. Increased amounts of the amide decrease the static generated on the fabric during tumble drying or wear.

The composition of the instant invention may be employed in either particulate, liquid, tablet, or any other conventional form. Moreover, as noted above, the secondary isostearamides, as disclosed herein, may be employed as antistatic fabric agents by being applied to said fabrics during the wash cycle of the washing process, or they may be premixed with the detergent materials.

The laundering and antistatic compositions of the present invention and the method of treating fabrics therewith will now be illustrated by the following more detailed examples thereof. It is noted, however, that these examples are merely illustrative of the invention, which is not construed to be limited thereto.

EXAMPLES 6–9

20 g Neodol 23-6.5[1] is added to a washing machine while it is being filled with 65 liters water at 120° F. After 1 minute, 3 g of the isostearamide is added. After another minute four fabrics, Dacron (D), nylon (N), Dacron-cotton (D/C) and acetate (Ac) are added. The fabrics are washed for 14 minutes, rinsed with cold water and tumbled dried.

[1] Ethoxylated $C_{12-13}$ aliphatic alcohol having an average of 6.5 moles ethylene oxide (Shell Co.)

A qualitative measure of the static protection conferred on the fabrics is the presence or absence of static/cling upon removal from the dryer. A more quantitative measure is obtained by determining the charge, in kilovolts, produced on each fabric when it is rubbed for 5 seconds with wool at low humidity; the sum of the absolute values of the charges on each fabric is a convenient measure of antistatic protection—a low number is best.

| Ex. | Isostear-amide | Dryer Static | Dacron pickup (g) | D | N | D/C | Ac | \|Sum\| |
|---|---|---|---|---|---|---|---|---|
| 6 | Methyl | slight | .24, .32 | −.8 | −.7 | −6.8 | +4.0 | 12 |
| 7 | Propyl | none | .58, .48 | −.6 | +2.6 | −7.6 | +4.5 | 15 |
| 8 | Octyl | none | .70, .67 | −.65 | ±.9 | −4.3 | +2.8 | 9 |
| 9 | Diethyl | yes | .13, .10 | −.5 | +5.2 | −9.5 | +4.5 | 20 |

N-octylisostearamide is the best of the four. The least effective is the diethyl isostearamide.

These results show the superiority of the higher alkylisostearamide (8 carbon chain) over the lower alkyl isostearamides as antistatic agents in the wash cycle during laundering with unbuilt nonionic detergents. The tertiary isostearamide, diethylisostearamide, has minimal antistatic activity. The Dacron pickup value is indicative of the substantivity of the amides to the fabric.

EXAMPLES 10–13

The procedure of Examples 6–9 is repeated using octylisostearamide antistatic agent in the absence (Examples 10 and 11) and presence (Examples 12 and 13) of 30 g sodium tripolyphosphate salt, said salt also being added to the washing machine along with the Neodol detergent during the wash fill.

| Ex. | Wash Water pH | Dryer Static | Dacron Pickup (g) | D | N | D/C | Ac | \|Sum\| |
|---|---|---|---|---|---|---|---|---|
| 10, 11 | 8.0, 7.8 | no | 1.18, 0.78 | −.11 | −0.7 | −3.0 | +3.6 | 7 |

-continued

| Ex. | Wash Water pH | Dryer Static | Dacron Pickup (g) | \multicolumn{4}{c|}{Static Test} | \|Sum\| |
|---|---|---|---|---|---|---|---|---|
| | | | | D | N | D/C | Ac | |
| 12, 13 | 8.8, 8.9 | no | 0.70, 0.53 | −.15 | −1.6 | −4.5 | +1.2 | 7 |

The isostearamide works equally well in unbuilt and tripolyphosphate built systems.

EXAMPLES 14–18, a, b, c, d

| Phosphate-built Anionic Detergent | |
|---|---|
| Ingredient | % |
| Sodium tridecyl benzenesulfonate | 15 |
| Nonionic detergent* | .5 |
| Sodium silicate (Na$_2$O:SiO$_2$ = 1:2.4) | 10.5 |
| Sodium tripolyphosphate | 33 |
| Sodium carbonate | 5 |
| Sodium sulfate | 24 |
| Sodium carboxymethylcellulose | .25 |
| Optical Brighteners | .5 |
| Borax | 1.0 |
| Perfume | .15 |
| Water | 10.1 |

*Ethoxylated fatty alcohol (C$_{12-15}$) with average of 7 moles ethylene oxide

EXAMPLE 15

This composition may be modified to contain 20% zeolite and a reduced phosphate salt content.

EXAMPLE 16

The composition of Example 14 may be modified to contain 20% Thixo-Jel (clay) softener and a reduced amount of phosphate salt.

EXAMPLE 17

The composition of Example 15, wherein the phosphate builder is replaced with nitrilotriacetate salt.

EXAMPLE 18

The composition of Example 14 may be modified to replaced the phosphate builder with sodium carbonate.

These compositions are spray dried to produce a powder.

To each composition is added 2–10 g of the amide antistatic agent, which is premixed with such composition by any suitable means, using rotation and/or agitation, with or without heat.
 a. N-decylisostearamide
 b. N-octylisostearamide
 c. N-cocoisostearamide
 d. N-tallowisostearamide EXAMPLES 19 and 20 a, b, c and d

| Built Nonionic Detergent | |
|---|---|
| Ingredient | % |
| Ethoxylated alcohol* | 19 |
| Sodium tripolyphosphate | 60 |
| Sodium silicate (Na$_2$O:SiO$_2$ = 1:2.4) | 10 |
| Optical Brighteners | 2 |
| Enzyme (Proteolytic) | 1.5 |
| Perfume and Color | 0.35 |
| Moisture | 7.15 |

*Ethoxylated fatty alcohol (C$_{12-13}$) condensed with an average of 6.5 moles ethylene oxide.

EXAMPLE 20

The composition of Example 19 may be modified by replacing part of the tripolyphosphate with sodium nitrilotriacetate salt.

To 40 g of this formulation which is in the form of a powder, are added 2–10 g of fabric antistatic agent:
 a. N-decylisostearamide
 b. N-octylisostearamide
 c. N-cocoisostearamide
 d. N-tallowisostearamide EXAMPLES 21 a, b, c, d

| Anionic/nonionic Detergent | |
|---|---|
| Ingredient | % |
| Ethoxylated alcohol* | 34.0 |
| Dodecylbenzene sulfonate | 8.5 |
| Ethanol | 6.5 |
| Triethanolamine | 0.5 |
| Sodium formate | 1.5 |
| Perfume | 0.5 |
| Optical brighteners | 0.6 |
| Color | 0.3 |
| Water | 47.6 |

*Fatty alcohol (C$_{12-13}$) condensed with an average of 6.5 moles ethylene oxide When 60 g of this liquid formulation are used in the washing machine, 2–10 g antistatic agent are also added:
 a. N-decylisostearamide
 b. N-octylisostearamide
 c. N-cocoisostearamide
 d. N-tallowisostearamide.

EXAMPLE 22

The efficacy of N-decylisostearamide as an antistatic agent in a typical tripolyphosphate-built anionic laundry detergent is tested by laundering a mixed fabric load (polyester, nylon, acetate and polyester-cotton blend) in 100 g of the composition of Example 14 a, to which had been added 0, 2, 4 or 6 g of N-decylisostearamide (Whirlpool washers, 120° F., 65 liters tap water). Static protection is quantified by measuring the charge developed on each of the dry fabrics by rubbing with wool in a controlled manner for 5 sec. The absolute values of these charges are summed to produce a Static Value; the smaller the number, the greater the static protection. The results of duplicate experiments are tabulated.

| g. Decylisostearamide | Static Value |
|---|---|
| 0 | 37, 33 |
| 2 | 17, 17 |
| 4 | 10, 11 |
| 6 | 7, 7 |

This Example clearly shows the antistatic properties of the secondary isostearamides of this invention, in amounts as low as about 2% by weight of the detergent composition, with increasing amounts of the amide effecting a decrease in the static generated.

Utility of the amides in reducing static electricity is shown in Table I, with test runs (Examples 23–49) in which different fabrics are washed in Whirlpool washers (65 liters tap water) at 120° F. with a mixed clean fabric load (cotton terry, dacron double knit, Banlon nylon, dacron/cotton 65/35), and tumbled dried. In each case, 6-3 g of the test material are pre-mixed with 95-100 g anionic detergent or 40 g nonionic detergent and the resulting composition is then added to the wash cycle of the laundering process.

The static value is the sum of the absolute values of surface charges of the 4 fabrics upon removal from the dryer, lower values being better.

TABLE I

| Ex. | Detergent | Amide | Dryer Static | Static Value |
|---|---|---|---|---|
| 23 | Ex. 14 | — | yes | 43,40 |
| 24 | Ex. 14 | 3 g decyl | no | 11 |
| 25 | Ex. 14 | 3 g coco | no | 14 |
| 26 | Ex. 14 | 6 g coco | no | 7 |
| 27 | Ex. 14 | 3 g tallow | no | 13 |
| 28 | Ex. 14 | 6 g tallow | no | 15 |
| 29 | Ex. 15 | — | yes | 47 |
| 30 | Ex. 16 | — | yes | 59,47 |
| 31 | Ex. 15 | 5 g coco | no | 10 |
| 32 | Ex. 16 | 5 g coco | no | 27 |
| 33* | Ex. 14 | 5 g octyl | no | 9 |
| 34* | Ex. 15 | 5 g octyl | no | 6 |
| 35* | Ex. 16 | 4 g octyl | no | 23 |
| 36* | Ex. 16 | 4 g coco | no | 19 |
| 37* | Ex. 16 | 6 g octyl | no | 19 |
| 38* | Ex. 16 | 6 g coco | no | 14 |
| 39* | Ex. 14 | 4 g coco | no | 12 |
| 40* | Ex. 16 | 4 g coco | no | 26 |
| 41* | Ex. 15 | 4 g coco | no | 13 |
| 42* | Ex. 17 | 4 g coco | no | 19 |
| 43** | Ex. 14 | 4 g coco | no | 14 |
| 44** | Ex. 14 | 4 g octyl | no | 13 |
| 45 | Ex. 19 | — | yes | 42 |
| 46 | Ex. 19 | 3 g coco | no | 25 |
| 47 | Ex. 19 | 5 g coco | no | 24 |
| 48 | Ex. 19 | 5 g tallow | no | 15 |
| 49 | Ex. 14 | 5 g tallow added separately, not mixed | no | 11 |

*The isostearamide is spread evenly over the inner surface of a 2 liter flask. The detergent is added to the flask and rotated in a hot water bath. The flask walls are scraped down once and the mixture is rotated again until all isostearamide is dispersed, affording a more even dispersion.
**4 g isostearamide dispersed with 94 g detergent, without heat.

Octyl, decyl, coco and tallow isostearamides, premixed with built anionic or nonionic detergents, are all effective antistatic agents.

By incorporating a bentonite clay as well as an isostearamide into a phosphate built anionic detergent the fabric softening effect of the former is obtained as well as the antistatic effect of the latter (Examples 32, 35, 36, 37, 38 and 40).

The particular detergent composition utilized does affect the antistatic properties of the isostearamide, with the phosphate built anionic detergent and the phosphate-zeolite built anionic both being more effective than the nitrilotriacetate built anionic, which is more effective than the phosphate/Thixo-Jel anionic detergent, (Examples 39-42). The isostearamide dispersed in built nonionic detergent has less antistat effectiveness, with inactivation apparently being due to its intimate contact with the nonionic surfactant (Examples 46, 47 and 48).

The isostearamide may be added per se or dispersed in, and/or absorbed onto a suitable absorbent substrate such as phosphate base beads, Microcel C, fabric, such as terry towel, or distributed on the surface of particulate detergent.

Table II shows the results (Examples 50-62) of the separate addition of 5 g antistatic agent, on various substrates, concomitantly with 100 g detergent, to the washer.

TABLE II

| Ex. | Detergent | Isostear-amide | Substrate | Static Value |
|---|---|---|---|---|
| 50 | Ex. 18 | coco | 10 g Phosphate base beads | 12 |
| 51 | Ex. 14 | coco | 8.8 g piece of towel | 10 |
| 52 | Ex. 14 | tallow | 8.8 g piece of towel | 10 |
| 53 | Ex. 14 | coco | 10 g Phosphate base beads | 14 |
| 54 | Ex. 14 | tallow | 10 g Phosphate base beads | 12 |
| 55 | Ex. 14 | coco | 4 g Microcel C | 9 |
| 56 | Ex. 14 | tallow | 4 g Microcel C | 15 |
| 57 | Ex. 14 | coco | 10 g Detergent | 13 |
| 58 | Ex. 14 | tallow | 10 g Detergent | 17 |
| 59 | 40 g Ex. 19 | coco | 4 g Microcel C | 15 |
| 60 | 40 g Ex. 20 | coco | 3 g Microcel C | 13 |
| 61 | Ex. 18 | coco | 3 g Microcel C | 12 |
| 62 | 60 g Ex. 21 | coco | 3 g Microcel C | 15 |

Infrared analysis of the material deposited during laundering on the Dacron fabric and recovered by ether extraction shows it to be only cocoisostearamide. Therefore, cocoisostearamide does not cause codeposition of surfactant.

The non-interference of coco isostearamide with detergency was shown by the data obtained after laundering standard soiled swatches (Test fabrics nylon, Test fabrics cotton, clay on cotton, clay on polyester-cotton, EMPA 101) with 100 g anionic detergent (Example 14) with and without the addition of 5 g coco isostearamide adsorbed on 4-5 g Microcel C. Clean synthetic fabric swatches were included to insure that antistatic effectiveness was achieved.

| Ex. | Coco Isostearamide | Dryer Static | Static Value | Reflectance of Soiled Swatches After Wash | | | | |
|---|---|---|---|---|---|---|---|---|
| | | | | TFN | TFC | CC | C-PC | EMPA |
| 63 | 0 | Heavy | 38 | 62.2 | 45.1 | 62.2 | 85.7 | 27.1 |
| 64 | 5 g | None | 9 | 63.0 | 44.7 | 66.8 | 85.5 | 31.1 |
| 65 | 5 g | None | 10 | 61.2 | 45.8 | 65.7 | 85.3 | 28.9 |

Other carriers or substrates useful for the isostearamides include puffed borax, soda ash, granular sodium tripolyphosphate, granular sodium pyrophosphate and other suitable absorbent carriers, preferably in a weight ratio of about 1-5 g isostearamide to 1.5-10 g substrate.

The method of incorporating the isostearamides into detergents affects the antistatic results. This accounts for the variation in performance from one experiment to another, using the same ingredients. The preferred form is the isostearamide dispersed on Microcel C (a synthetic calcium silicate), as a separate additive to the washer during the wash cycle of the laundering process.

Using concentrations from 7.5 to 240 ppm, the compounds of this invention have no significant effect on overall detergency of the soiled swatches, cause no loss in brightener efficiency, and cause no significant yellowing of nylon or cotton, in contrast to an equal weight of a quaternary ammonium type antistatic agent, which was deficient in all these areas.

The ability of the secondary N-alkylisostearamides to reduce static electricity in the presence of both anionic and nonionic detergents and mixtures thereof, either built or unbuilt, has been clearly shown with respect to the compositions of Examples 14–21.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. An antistatic composition for use in the wash cycle of fabric laundering comprising an effective antistatic amount of N-alkylisostearamide antistatic agent having the formula:

RCONHR' wherein RCO is derived from isostearic acid, and R' is a primary saturated or unsaturated aliphatic hydrocarbon chain containing 1–18 carbons, dispersed into and/or absorbed onto an absorbent substrate.

2. The composition in accordance with claim 1, wherein R' is a primary aliphatic chain containing 7–18 carbons.

3. The composition in accordance with claim 2, wherein the antistatic agent is cocoalkylisostearamide.

4. The composition in accordance with claim 2, wherein the antistatic agent is hydrogenated tallowisostearamide.

5. The composition in accordance with claim 2, wherein the antistatic agent is decylisostearamide.

6. The composition in accordance with claim 1, wherein R is a complex mixture of branched-chain isomers of stearic acid.

7. The antistatic composition of claim 1, wherein the substrate is a carbonate base bead comprising sodium bicarbonate, sodium carbonate and silicate solids.

8. The antistatic composition of claim 1, wherein the substrate is a particulate detergent.

9. The antistatic composition of claim 1, wherein the substrate is synthetic calcium silicate.

10. The antistatic composition of claim 1, wherein the substrate is a phosphate base bead comprising tripolyphosphate and sodium silicate solids.

11. An antistatic composition for laundering fabrics comprising an effective antistatic amount of an N-alkylisostearamide antistatic agent having the formula:

RCONHR' wherein RCO is derived from isostearic acid, and R' is a primary saturated or unsaturated aliphatic hydrocarbon chain containing 1–18 carbons, and a detergent selected from the group consisting of anionic, nonionic, amphoteric detergent materials, and mixtures thereof.

12. The antistatic composition in accordance with claim 11, containing about 2–25% by weight of the amide antistatic agent, and a nonionic detergent.

13. The composition of claim 12, additionally comprising optical brighteners and builders.

14. The composition of claim 11, wherein the detergent is anionic and the antistatic agent constitutes about 2–25% by weight of the composition.

15. The composition of claim 14, additionally comprising optical brighteners and builders.

16. The method of imparting antistatic properties to fabrics during laundering which comprises treating said fabrics during the wash cycle with the antistatic composition defined in claim 1.

17. A process of imparting antistatic properties to fabrics which consists in treating fabrics with the composition defined in claim 1, during laundering.

18. A method of protecting fabrics against acquiring static electricity during the laundering process comprising contacting fabrics with the composition of claim 11.

19. The method of claim 17, wherein the antistatic isostearamide agent is separately added during the wash cycle.

20. The method of imparting antistatic properties to fabrics during laundering which comprises treating said fabrics during the wash cycle with the antistatic composition of claim 11.

* * * * *